United States Patent
Sheikh et al.

(10) Patent No.: US 9,733,118 B2
(45) Date of Patent: Aug. 15, 2017

(54) COMPACT HANDHELD SCALE FOR LUGGAGE

(71) Applicant: Heys International Ltd., Mississauga (CA)

(72) Inventors: Emran Sheikh, Mississauga (CA); Alden Evangelista, Woodbridge (CA)

(73) Assignee: Heys International Ltd., Mississauga (CA)

( * ) Notice: Subject to any disclaimer, the term of this patent is extended or adjusted under 35 U.S.C. 154(b) by 93 days.

(21) Appl. No.: 14/723,513

(22) Filed: May 28, 2015

(65) Prior Publication Data

US 2015/0346020 A1   Dec. 3, 2015

Related U.S. Application Data

(60) Provisional application No. 62/003,568, filed on May 28, 2014, provisional application No. 62/107,001, filed on Jan. 23, 2015.

(51) Int. Cl.
| | | |
|---|---|---|
| *G01G 19/58* | (2006.01) | |
| *H01H 3/16* | (2006.01) | |
| *G01L 1/22* | (2006.01) | |

(52) U.S. Cl.
CPC ............ *G01G 19/58* (2013.01); *H01H 3/162* (2013.01); *G01L 1/2212* (2013.01)

(58) Field of Classification Search
CPC ...... H01H 3/162; G01G 19/58; G01L 1/2206; G01L 1/22012; G01L 1/2212
USPC ........................................................ D10/89
See application file for complete search history.

(56) References Cited

U.S. PATENT DOCUMENTS

| 960,535 | A | * | 6/1910 | Gilfillan | G01G 19/002 177/127 |
|---|---|---|---|---|---|
| D150,146 | S | * | 7/1948 | Mandolf et al. | D10/72 |
| 2,603,474 | A | * | 7/1952 | Mandolf | G01G 3/02 177/126 |

(Continued)

FOREIGN PATENT DOCUMENTS

| WO | 2011094039 A2 | 8/2011 |
|---|---|---|
| WO | 2013124839 A1 | 8/2013 |

OTHER PUBLICATIONS

Heys International Ltd., European Search Report, Application No. 15169170.6, Jul. 31, 2015.

*Primary Examiner* — Randy Gibson
(74) *Attorney, Agent, or Firm* — Bereskin & Parr LLP/S.E.N.C.R.L., s.r.l.

(57) ABSTRACT

A handheld scale for weighing luggage having a body housing a power source, a processor, and a display, a luggage engagement member rotatably coupled to the body and moveable between a first position and a second position in which the luggage engagement member presents a surface from which a piece of luggage can be supported, a load sensor, and a switch activated by the luggage engagement member, the switch being configured such that when the luggage engagement member is in the second position, the power source is operatively coupled to the display, and the processor is configured to receive, from the load sensor, a signal proportional to a force applied to the surface relative to the body, and to provide, via the display, an indication of the force; and when the luggage engagement member is in the first position, the power source is operatively decoupled from at least the display.

20 Claims, 19 Drawing Sheets

(56) References Cited

U.S. PATENT DOCUMENTS

| | | | | |
|---|---|---|---|---|
| 2,873,341 | A * | 2/1959 | Kutsay | G01L 1/2212 338/6 |
| 3,695,096 | A * | 10/1972 | Kutsay | G01L 1/2225 73/761 |
| D229,092 | S * | 11/1973 | Quenot | D10/62 |
| 4,660,666 | A * | 4/1987 | Reder | G01G 3/1402 177/126 |
| 5,077,551 | A * | 12/1991 | Saitou | G06F 1/1616 16/297 |
| 5,615,259 | A * | 3/1997 | Gilbert | H04M 1/0216 16/374 |
| 5,956,398 | A * | 9/1999 | Weadon | H01H 3/162 379/433.05 |
| 6,774,320 | B2 * | 8/2004 | Simons | G01G 23/3728 177/147 |
| 7,238,895 | B2 * | 7/2007 | Dittrich | G01G 23/3728 177/126 |
| 7,238,900 | B2 * | 7/2007 | Ulfik | E05D 11/00 200/61.62 |
| 7,358,449 | B2 * | 4/2008 | Hannon | G01G 23/3728 177/131 |
| D575,178 | S * | 8/2008 | Thybulle | D10/89 |
| D575,179 | S * | 8/2008 | Thybulle | D10/89 |
| 7,645,949 | B1 | 1/2010 | Thompson | |
| 7,873,159 | B2 * | 1/2011 | Nurmi | G06F 1/1616 379/433.13 |
| D742,769 | S * | 11/2015 | Sheikh | D10/89 |
| D743,283 | S * | 11/2015 | Sheikh | D10/89 |
| 2007/0268283 | A1 * | 11/2007 | Wang | G06F 1/1616 345/211 |
| 2015/0160069 | A1 * | 6/2015 | Kellis | G01G 19/58 177/127 |

* cited by examiner

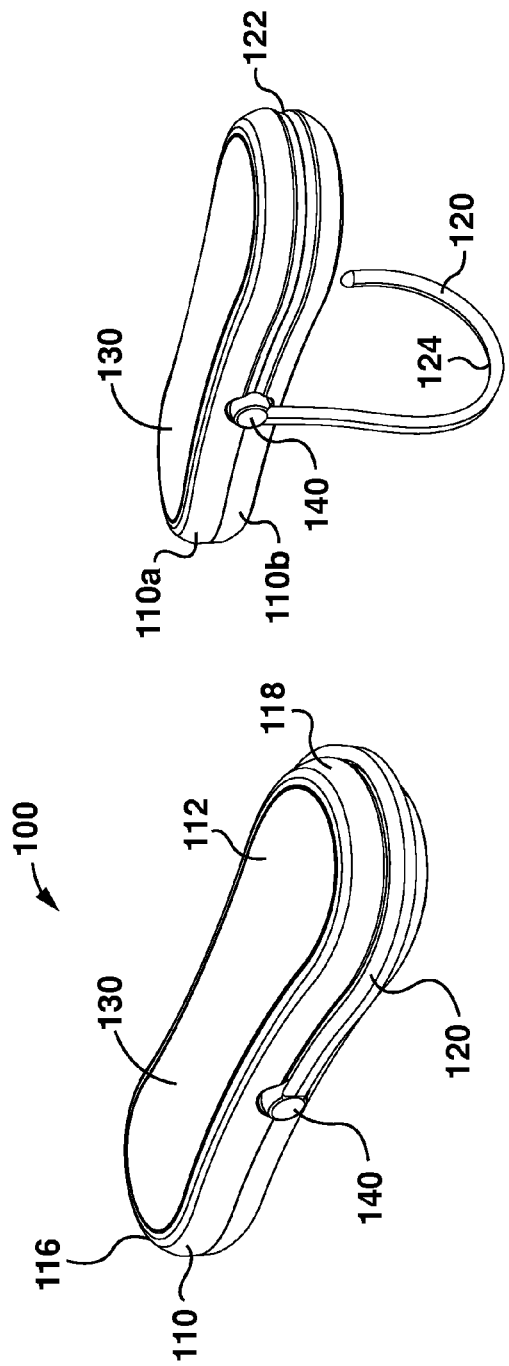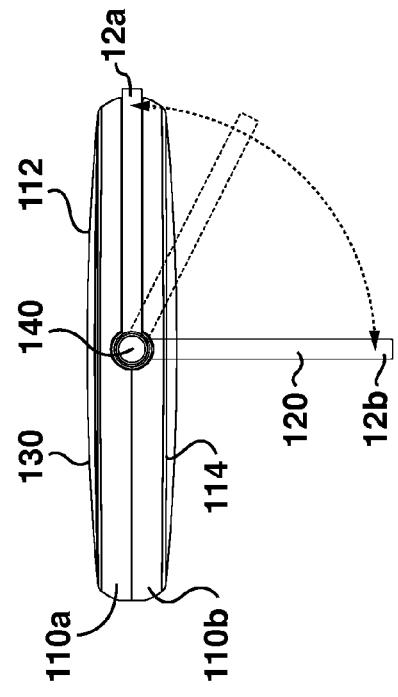

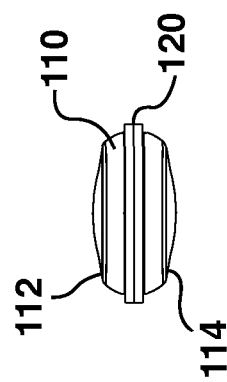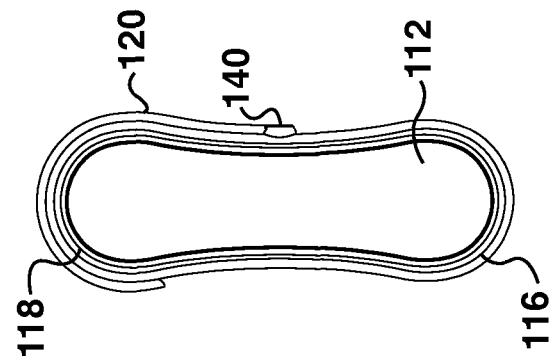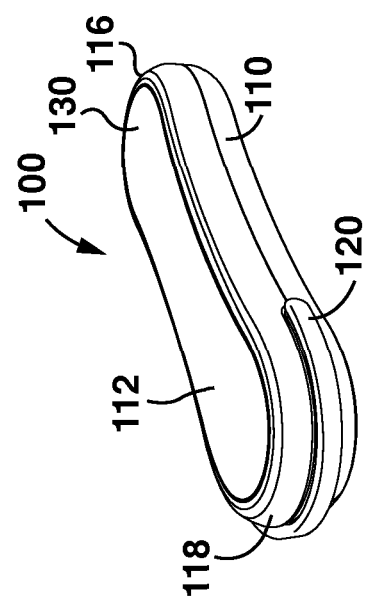

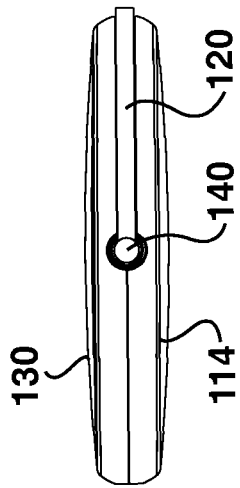
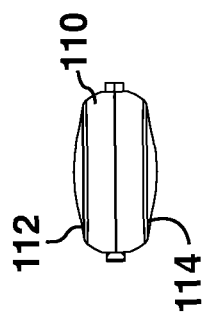
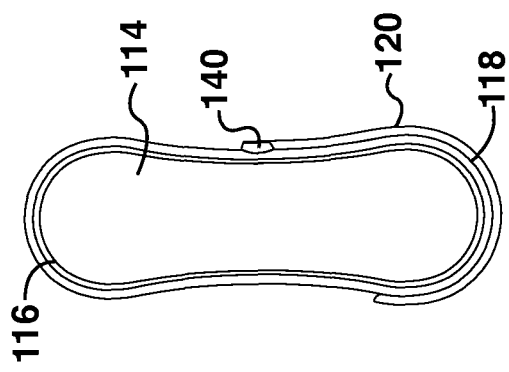
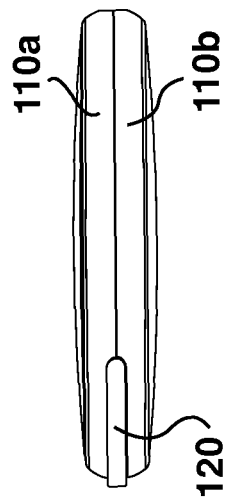
FIG. 2G
FIG. 2D
FIG. 2E
FIG. 2F

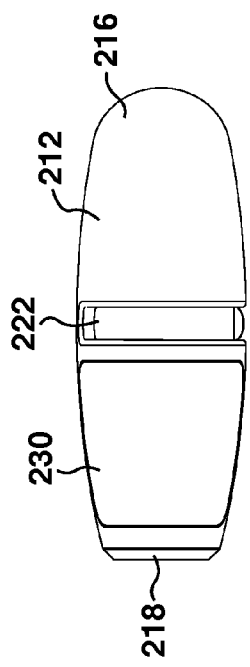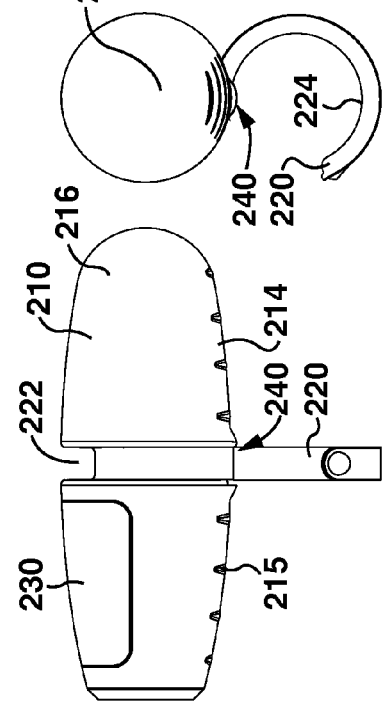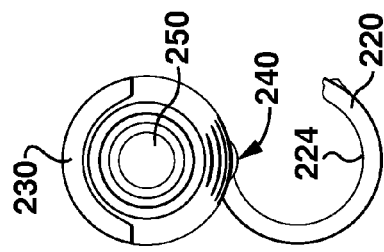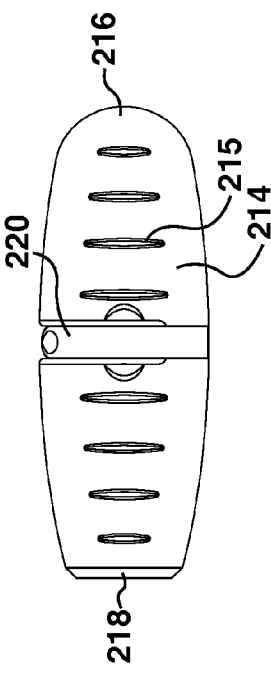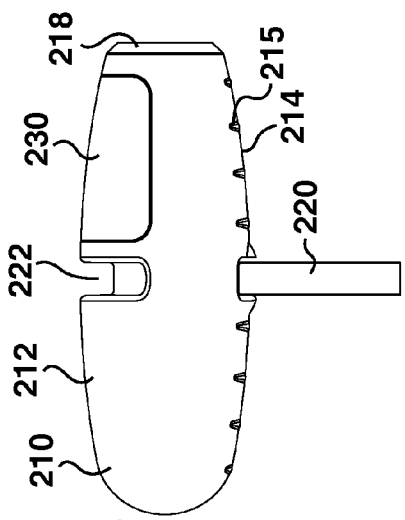

COMPACT HANDHELD SCALE FOR LUGGAGE

This application claims the benefit of Provisional Application No. 60/003,568 filed May 28, 2014 and Provisional Application No. 62/107,001 filed Jan. 23, 2015, the contents of which are herein incorporated by reference.

FIELD

The described embodiments relate to scales for weighing luggage, and more specifically to compact handheld scales for weighing luggage.

INTRODUCTION

Luggage is often used to transport clothes, goods, and/or other personal effects or items, particularly when travelling. There are numerous types of luggage, including, but not limited to suitcases, garment bags, tote bags, backpacks, and duffel bags. Also, luggage comes in a wide variety of sizes, styles, and materials.

In some circumstances, for example when travelling via aeroplane, it may be useful to know the weight of a piece of luggage after it has been packed (i.e. loaded with one or more items). For example, an airline may specify one or more weight limits for luggage (e.g. for carry-on and for checked baggage), and overweight luggage may be subject to a surcharge and/or not allowed.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided a handheld scale for weighing luggage, the scale comprising: a body housing a power source, a processor, and a display, the processor being operatively coupled to the display; a luggage engagement member rotatably coupled to the body and moveable between a first position in which the luggage engagement member is generally contiguous with the body, and a second position in which the luggage engagement member presents a surface from which a piece of luggage can be supported; a load sensor operatively coupled to the luggage engagement member and the processor; and a switch activated by the luggage engagement member, the switch being configured such that: when the luggage engagement member is in the second position, the power source is operatively coupled to the display, the processor, and the load sensor, and the processor is configured to receive, from the load sensor, a signal proportional to a force applied to the surface relative to the body, and to provide, via the display, an indication of the force; and when the luggage engagement member is in the first position, the power source is operatively decoupled from at least the display.

In some embodiments, the body has a first and second opposed ends, a rotational coupling between the luggage engagement member and the body is located between the first and second opposed ends, and wherein, in the first position, the surface is located proximate one of the first and second ends.

In some embodiments, the luggage engagement member is generally hook shaped.

In some embodiments, the load sensor is positioned within the luggage engagement member.

In some embodiments, the load sensor is positioned within a rotational coupling between the luggage engagement member and the body.

In some embodiments, the indication comprises a numeric value in one of pounds and kilograms.

In some embodiments, the indication comprises an indication as to whether the force exceeds a specified value.

In another broad aspect, there is provided a handheld scale for weighing luggage, the scale comprising: a body housing a power source, a processor, and a display, the processor being operatively coupled to the display; a luggage engagement member rotatably coupled to the body and moveable between a first position in which the luggage engagement member is generally contiguous with the body, and a second position in which the luggage engagement member presents a surface from which a piece of luggage can be supported; a load sensor operatively coupled to the luggage engagement member and the processor; and a switch configured to be actuated by a user; the processor being configured such that, in response to an actuation of the switch while the luggage engagement member is in the second position, the processor is configured to receive, from the load sensor, a signal proportional to a force applied to the surface relative to the body, and to provide, via the display, an indication of the force.

In some embodiments, the body has a first and second opposed ends, a rotational coupling between the luggage engagement member and the body is located between the first and second opposed ends, and in the first position, the luggage engagement member is located between the first and second ends.

In some embodiments, the switch is located at one of the first and second ends.

In some embodiments, the body is generally cylindrical, and the luggage engagement member is generally arc shaped.

In some embodiments, the body has a longitudinal axis, and the luggage engagement member rotates about an axis that is parallel to and offset from the longitudinal axis.

In some embodiments, the load sensor is positioned within the luggage engagement member.

In some embodiments, the load sensor is positioned within a rotational coupling between the luggage engagement member and the body.

In some embodiments, the display is located on an upper surface of the body, and a lower surface of the body comprises at least one surface feature for assisting a user to grip the handheld scale.

In some embodiments, the indication comprises a numeric value in one of pounds and kilograms.

In some embodiments, the indication comprises an indication as to whether the force exceeds a specified value.

In another broad aspect, there is provided a handheld scale for weighing luggage, the scale comprising: a luggage engagement member rotatably coupled to a body of the scale and moveable between a stowed position and a deployed position; and a switch activated by the luggage engagement member, the switch being configured such that: when the luggage engagement member is moved to the stowed position, a display of the scale is activated, and when the luggage engagement member is moved to the deployed position, the display is deactivated.

In some embodiments, in the stowed position, the luggage engagement member is generally contiguous with the body, and in the deployed position, the luggage engagement member presents a surface from which a piece of luggage can be supported.

In some embodiments, the handheld scale further comprises a load sensor and a processor, the processor being operatively coupled to the display and configured to receive, from the load sensor, a signal proportional to a force applied to the surface relative to the body, and when the display is active to provide, via the display, an indication of the force.

In another broad aspect, there is provided a method for activating the display of a handheld luggage scale, the method comprising: rotating a luggage engagement member from a stowed position in which the luggage engagement member is generally contiguous with a body of the scale, to a deployed position in which the luggage engagement member presents a surface from which a piece of luggage can be supported.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 1A is a perspective view of a handheld scale for weighing luggage in accordance with at least one embodiment with a luggage engagement member in a first position;

FIG. 1B is a perspective view of the handheld scale of FIG. 1A with a luggage engagement member in a second position;

FIG. 1C is a side view of the handheld scale of FIG. 1A showing the luggage engagement member in a number of positions FIG. 2A is another perspective view of the handheld scale of FIG. 1A with the luggage engagement member in the first position;

FIG. 2B is a rear view of the handheld scale of FIG. 2A;
FIG. 2C is a top view of the handheld scale of FIG. 2A;
FIG. 2D is a front view of the handheld scale of FIG. 2A;
FIG. 2E is a bottom view of the handheld scale of FIG. 2A;
FIG. 2F is a left side view of the handheld scale of FIG. 2A;
FIG. 2G is a right side view of the handheld scale of FIG. 2A;

FIG. 6B is a rear view of the handheld scale of FIG. 6A;
FIG. 6C is a top view of the handheld scale of FIG. 6A;
FIG. 6D is a front view of the handheld scale of FIG. 6A;
FIG. 6E is a bottom view of the handheld scale of FIG. 6A;
FIG. 6F is a left side view of the handheld scale of FIG. 6A;
FIG. 6G is a right side view of the handheld scale of FIG. 6A;

Figure 3B:
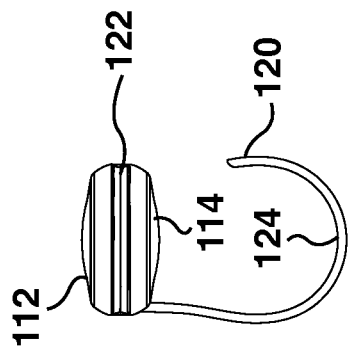
FIG. 3B is a rear view of the handheld scale of FIG. 3A.
Figure 3C:
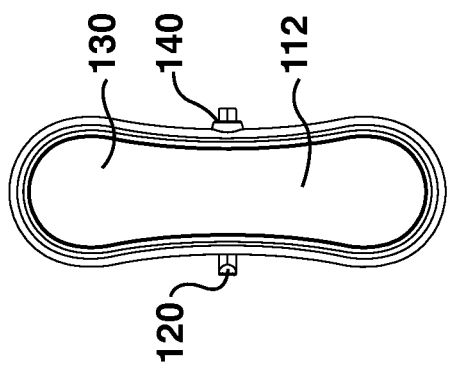
FIG. 3C is a top view of the handheld scale of FIG. 3A.
Figure 3A:
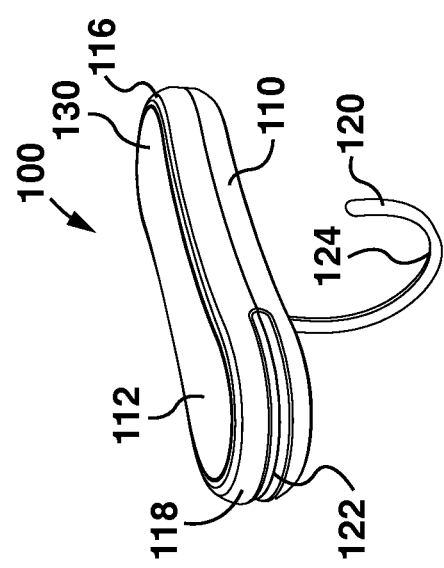
FIG. 3A is another perspective view of the handheld scale of FIG. 1A with the luggage engagement member in the second position.
Figure 3F:
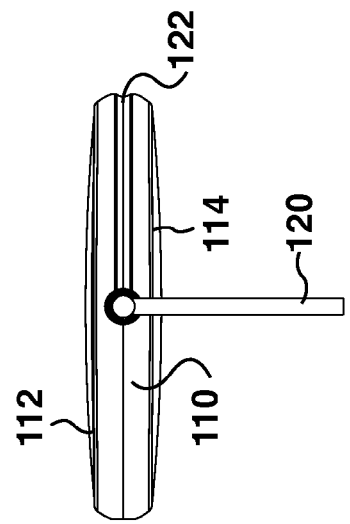
FIG. 3F is a left side view of the handheld scale of FIG. 3A.
Figure 3D:
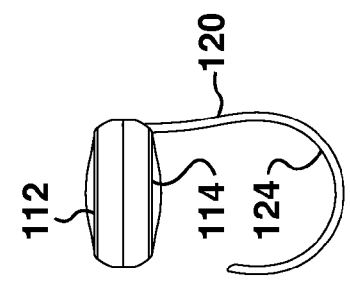
FIG. 3D is a front view of the handheld scale of FIG. 3A.
Figure 3G:
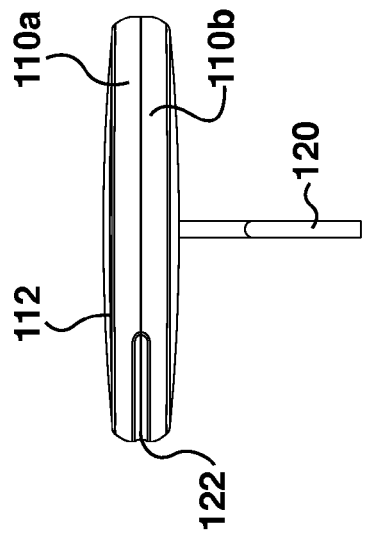
FIG. 3G is a right side view of the handheld scale of FIG. 3A.
Figure 3E:
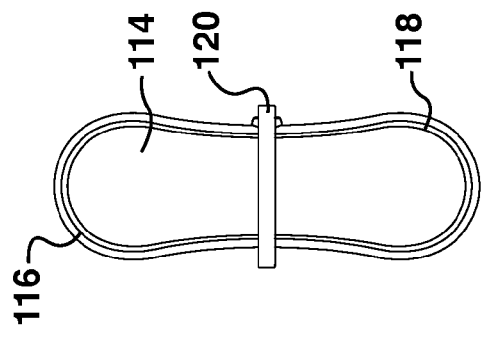
FIG. 3E is a bottom view of the handheld scale of FIG. 3A.
Figure 4:
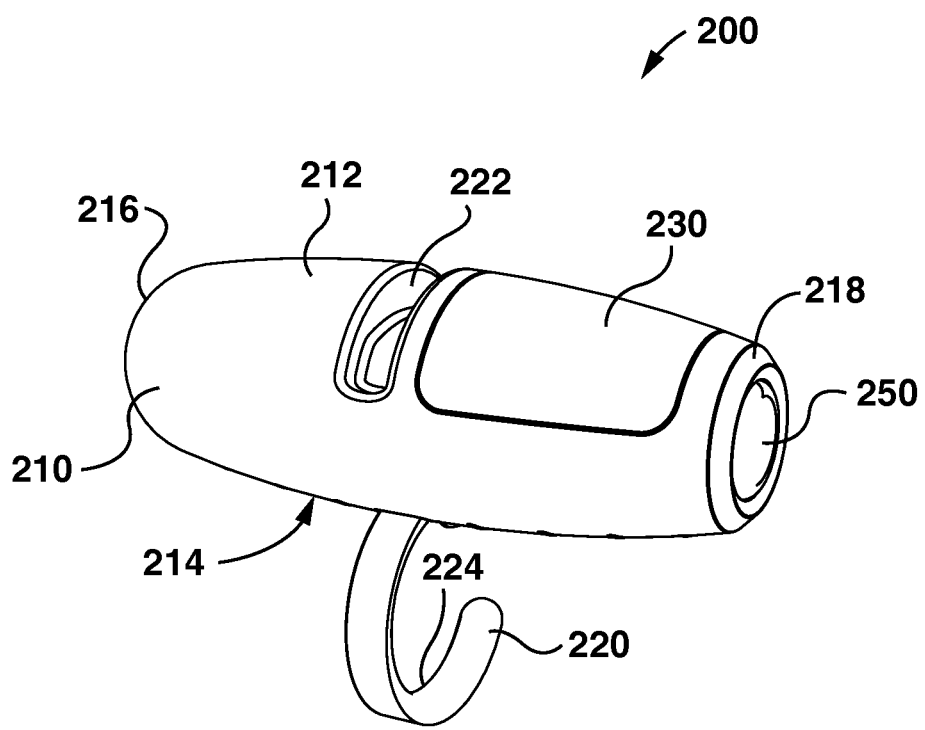
FIG. 4 is a perspective view of a handheld scale for weighing luggage in accordance with another embodiment.
Figure 5A:
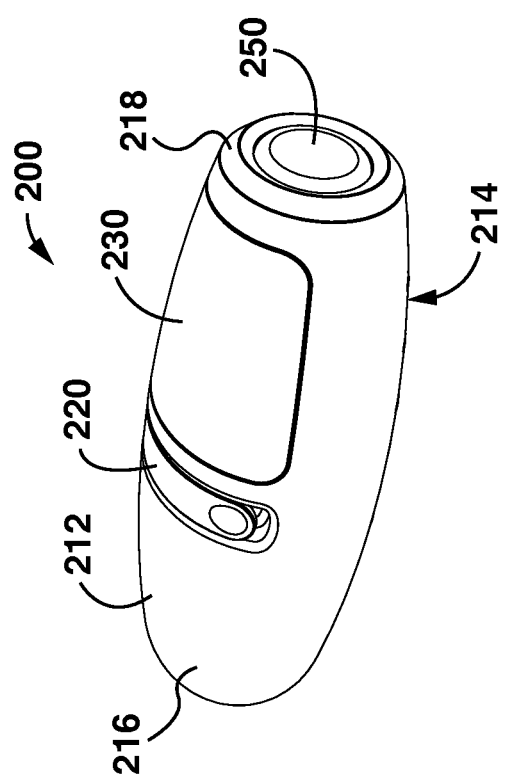
FIG. 5A is another perspective view of the handheld scale of FIG. 4 with the luggage engagement member in the first position.
Figure 5C:
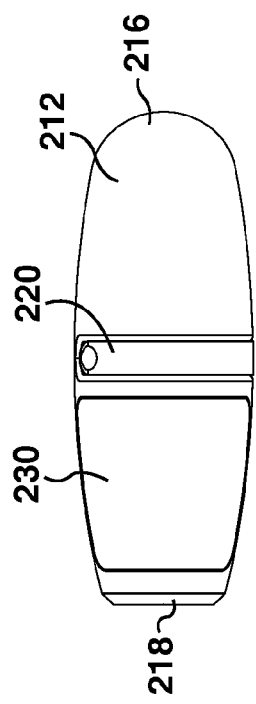
FIG. 5C is a top view of the handheld scale of FIG. 5A.
Figure 5G:
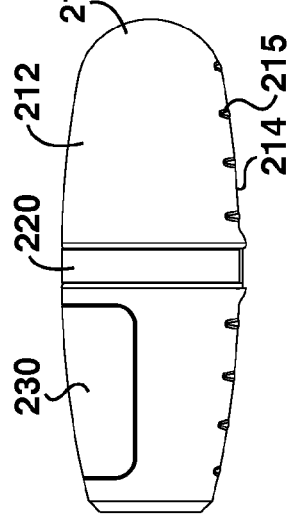
FIG. 5G is a right side view of the handheld scale of FIG. 5A.
Figure 5B:
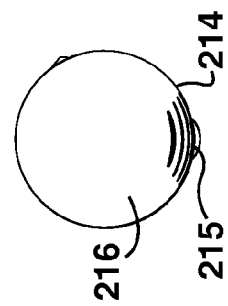
FIG. 5B is a rear view of the handheld scale of FIG. 5A.
Figure 5D:
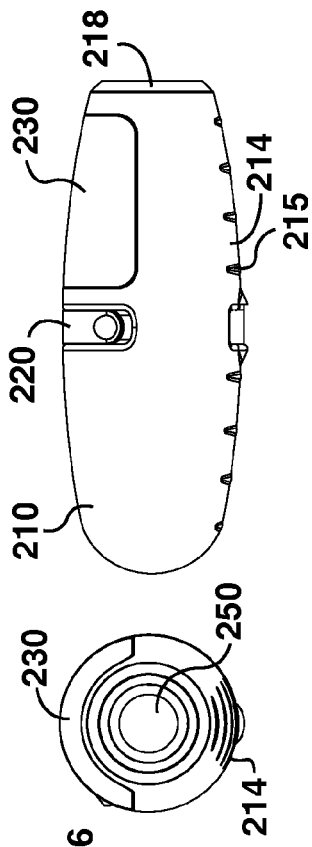
FIG. 5D is a front view of the handheld scale of FIG. 5A.
Figure 5F:
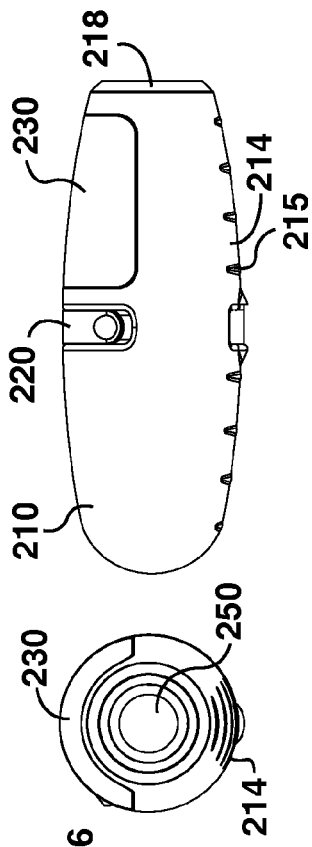
FIG. 5F is a left side view of the handheld scale of FIG. 5A.
Figure 5E:
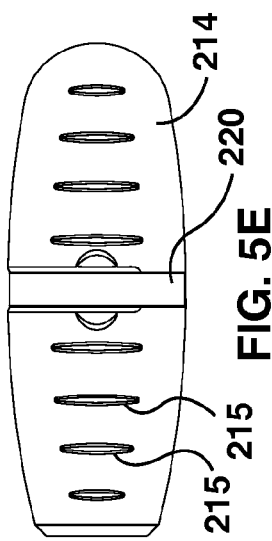
FIG. 5E is a bottom view of the handheld scale of FIG. 5A.
Figure 6A:
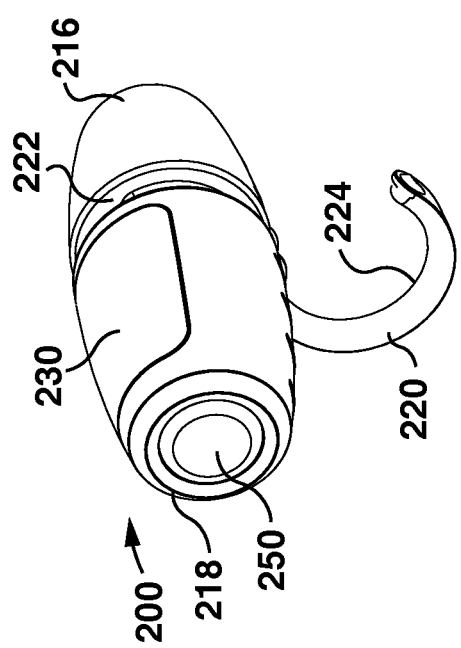
FIG. 6A is another perspective view of the handheld scale of FIG. 5A with the luggage engagement member in the second position.

It will be understood that reference to the drawings is made for illustration purposes only, and is not intended to limit the scope of the embodiments described herein below in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

One way to determine the weight of a piece of luggage after it has been packed is to use a handheld luggage scale. Referring to FIGS. 1A-3G, an example of a handheld scale for weighing luggage is shown generally as 100. Scale 100 includes a body 110 having an upper face 112, a lower face 114, a first end 116, and a second end 118. In the illustrated embodiment, body 110 primarily comprises complimentary body portions 110a and 100b. These body portions may be secured in any suitable fashion to form body 110. It will be appreciated that, in variant embodiments, body 110 may comprise more or fewer body portions. Body 110 may be formed from any suitable material (e.g. aluminum, thermoplastic) selected so as to be durable and resistant to deformation and damage.

Scale 100 also includes a luggage engagement member 120. Luggage engagement member 120 is coupled to body 110 via a rotatable coupling 140. In this way, as illustrated in FIG. 1C, luggage engagement member 120 can be rotated from a 'folded' or 'stored' or 'closed' position 12a (e.g. a position in which luggage engagement member 120 is generally contiguous with body 110) as shown in FIG. 1A, to an 'active' or 'opened' position 12b (e.g. a position in which luggage engagement member 120 presents a surface 124 from which a piece of luggage can be supported) as shown in FIG. 1B. In this way, scale 100 is readily convertible between a compact overall shape, which may be advantageous when transporting and/or storing scale 100, and a configuration in which luggage can be weighed.

In the illustrated embodiment, luggage engagement member 120 is generally hook-shaped, although it will be appreciated that luggage engagement member 120 may take other shapes. For example, the shape of luggage engagement member 120 may be selected based on the shape of body 110, so that luggage engagement member 120 may be rotated or folded into a position generally contiguous to body 110.

Optionally, as shown in FIG. 1B, body 110 may be provided with a recess 122 or other surface feature for releasably retaining luggage engagement member 120 in a closed position until scale 100 is intended to be used, at which time luggage engagement member 120 may be rotated (e.g. by a user) from the closed position to an open position. It will be appreciated that alternatively, or additionally, one or more other retaining features (e.g. one or more surface features on surface 124, detent features on body 110, detent features in rotatable coupling 140) may be used.

Scale 100 also includes an electronic scale mechanism for calculating a weight of a load (e.g. a luggage bag) suspended from luggage engagement member 120. For example, if the luggage engagement member 120 is in an open position and hooked through a handle or other projection (e.g. a clasp, buckle, belt, or latch) of a piece of luggage, and scale 100 is then lifted by a user (e.g. by grasping the body 110), indirectly lifting the luggage so that it is only supported by the luggage engagement member 120, the electronic scale mechanism can measure an amount of force being borne by the luggage engagement member 120. This force reading can be converted by the electronic scale mechanism into the calculated weight of the luggage. In some examples, the electronic scale mechanism can include a suitable load cell coupled to a processing device, such as a microprocessor or microcontroller.

In some embodiments, the electronic scale mechanism is housed entirely within the body 110. Alternatively, some or all of the electronic scale mechanism may be positioned on (or within) luggage engagement member 120. For example, a load cell may be positioned within luggage engagement member 120, while a processor for receiving and processing signals from the load cell may be positioned within body 110. In some embodiments, the luggage engagement member 120 itself may function as a load cell (or as part of a load cell).

Alternatively, or additionally, some or all of the electronic scale mechanism may be positioned on (or within) rotatable coupling 140.

Scale 100 also includes a display 130. The display 130 displays the weight of a suspended load (e.g. a luggage bag) calculated by the electronic scale mechanism. Preferably, as shown in the illustrated embodiment, display 130 is located on the top face 112 of the body 110. Display 130 may be any suitable display device, such as, for example, a liquid crystal display (LCD), a segment display, an Organic LED (OLED) display, a light emitting diode (LED) display, or an electrophoretic display. Display screen 130 may also be a touch screen display, capable of receiving input from a user.

Display 130 may be configured to display one or more units of mass, e.g. pounds "lb" and kilograms "kg". In some examples, the body 110 may include an additional button (not shown) for toggling between the units. In other examples, the electronic scale mechanism may be configured to toggle automatically between the units, e.g., with every on/off cycle, or after a predetermined interval of time, e.g. 2 seconds, and a toggle button can be omitted.

Alternatively, or additionally, display 130 may be configured to provide an indication as to whether or not the weight of a suspended load (e.g. a luggage bag) exceeds a specified value. For example, some airlines may impose a weight limit (e.g. 22 lbs) for carry-on luggage. If scale 100 is configured with 22 lbs as a specified value, display 130 may be configured to display one symbol (e.g. a check mark) if the weight of a bag suspended from scale 100 is below this value, and configured to display another symbol (e.g. an X) if the weight of a bag suspended from scale 100 is above this value.

Other signaling members may be provided as an alternative to, or in addition to, display screen 130. For example, an audio signaling member (not shown) such as an electroacoustic transducer (or speaker) may be configured to provide an audible tone in response to the electronic scale mechanism detecting that the weight of a bag suspended from scale 100 is above a specified value.

Scale 100 also includes at least one suitable power source (e.g. a battery) (not shown), preferably housed within the body 110 for powering the electronic scale mechanism and the electronic display 130. In some examples, the power source may be designed to be replaceable, e.g., housed within an accessible compartment. Alternatively, or additionally, the power source may be rechargeable.

Various configurations are possible for the electronic scale mechanism and the electronic display 130. In some embodiments, the electronic scale mechanism and the electronic display 130 may be configured to turn on when the luggage engagement member 120 is moved from the closed position to an open position (e.g. as shown in FIG. 1B). For example, a switch (not shown) may be provided within body 110 and/or rotatable coupling 140. Actuation of the switch (e.g. by rotating the luggage engagement member 120 to or towards the closed position shown in FIG. 1A) may turn off display 130 and/or some or all of the electronic scale mechanism. Display 130 and/or the electronic scale mechanism may be turned off by operatively decoupling display 130 and/or the electronic scale mechanism from the power source.

In this way, the scale can be 'turned on' (e.g. the display 130 can be activated) simply by rotating luggage engagement member 120 from a stowed position to a deployed position (e.g. from 12a to 12b in FIG. 1C). Similarly, the scale can be 'turned off' (e.g. the display 130 can be deactivated) simply by rotating luggage engagement member 120 to the stowed position (e.g. from 12b to 12a).

Alternatively, or additionally, display 130 may be configured to turn on when a load is applied to surface 124 of luggage engagement member 120 (e.g. when a user lifts a luggage bag using the scale 100). For example, display 130 may be configured to turn on only if luggage engagement member 120 is in the open position and subject to a load.

In some embodiments, display 130 may be configured to turn off when the luggage engagement member 120 is moved to the closed position (e.g. as shown in FIG. 1A). Alternatively, or additionally, display 130 may be configured to turn off after a predetermined interval of time, e.g. 2 seconds, or 5 seconds, or 10 seconds.

Where display 130 and/or or the electronic scale mechanism can be turned on or off based on the position of luggage engagement member 120 relative to body 110—i.e. where luggage engagement member 120 functions as an on/off switch—external buttons and/or other physical switches may not be necessary and can be omitted. In this respect, the example handheld scale illustrated in FIGS. 1A-3G may be characterized by an absence of external buttons.

Reference is now made to FIGS. 4-8, which exemplify another example embodiment of a handheld scale for weighing luggage. Similar to scale 100, scale 200 includes a body 210, a luggage engagement member 220, and a display 230. Components similar to those in scale 100 have been similarly numbered, and will not be described further.

Scale 200 comprises a button 250 for turning display 230 on or off, and/or for controlling one or more function of the electronic scale mechanism and/or the electronic display 130. For example, button 250 may be positioned or toggled so that the power source is electrically coupled or decoupled from display 230 and/or the electronic scale mechanism (not shown) from the power source (not shown).

Figure 7:
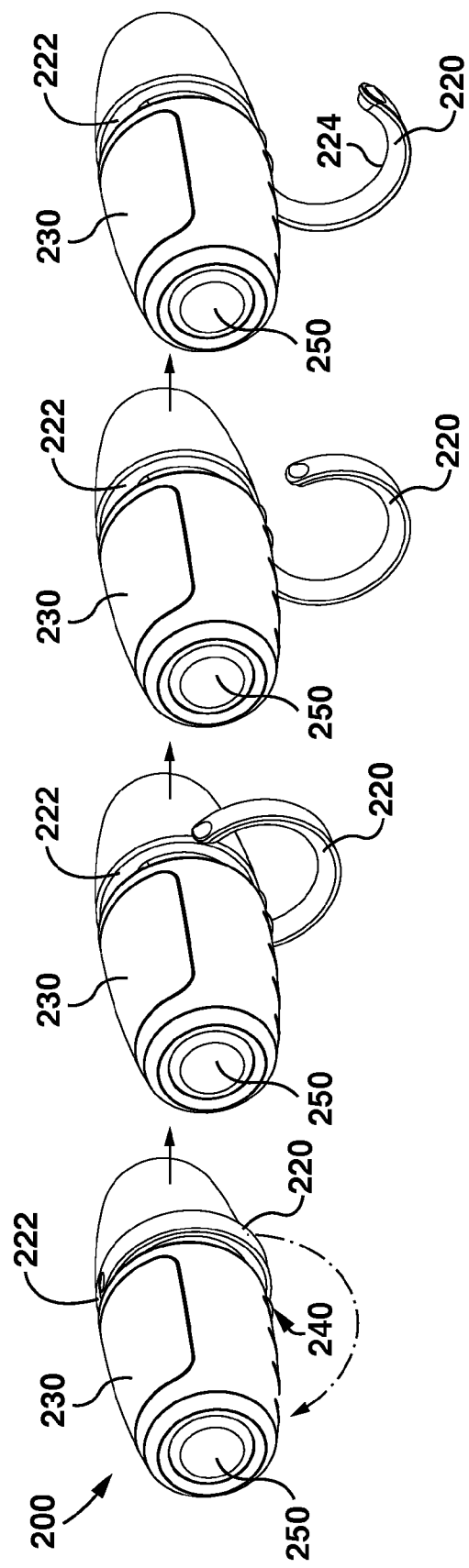
FIG. 7 is a series of perspective views of the handheld scale of FIG. 4 showing the luggage engagement member moving from the first position to the second position.
Figure 8:
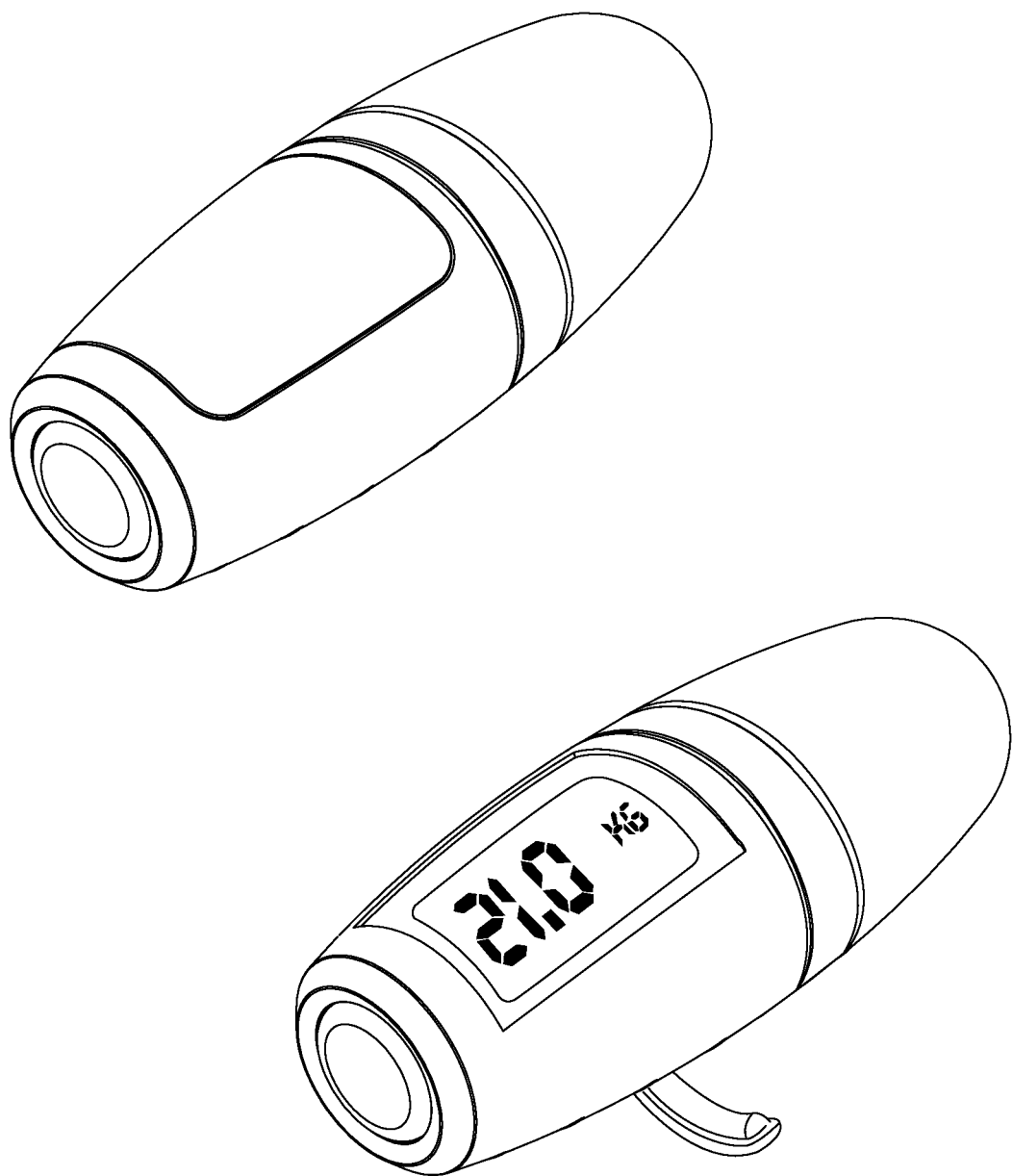
FIG. 8 is a perspective view of two handheld scales for weighing luggage in accordance with another embodiment.

Luggage engagement member 220 is similar to luggage engagement member 120, but is positioned differently with respect to body 210, and rotates about an axis offset from the longitudinal axis of body 210, as shown in FIG. 7.

The lower face 214 of scale 200 is shown with at least one surface feature 215 for assisting a user to grip the handheld scale. Alternatively, or additionally, the lower face 214 may be formed at least partially of an elastomeric material, e.g., a thermoplastic elastomer.

Reference is now made to FIGS. 9A-D, which exemplify another example embodiment of a handheld scale for weighing luggage. Similar to scales 100 and 200, scale 300 includes a body 310, a luggage engagement member 320, and a display 330. Components similar to those in scale 100 and 200 have been similarly numbered, and will not be described further.

Figure 9A:
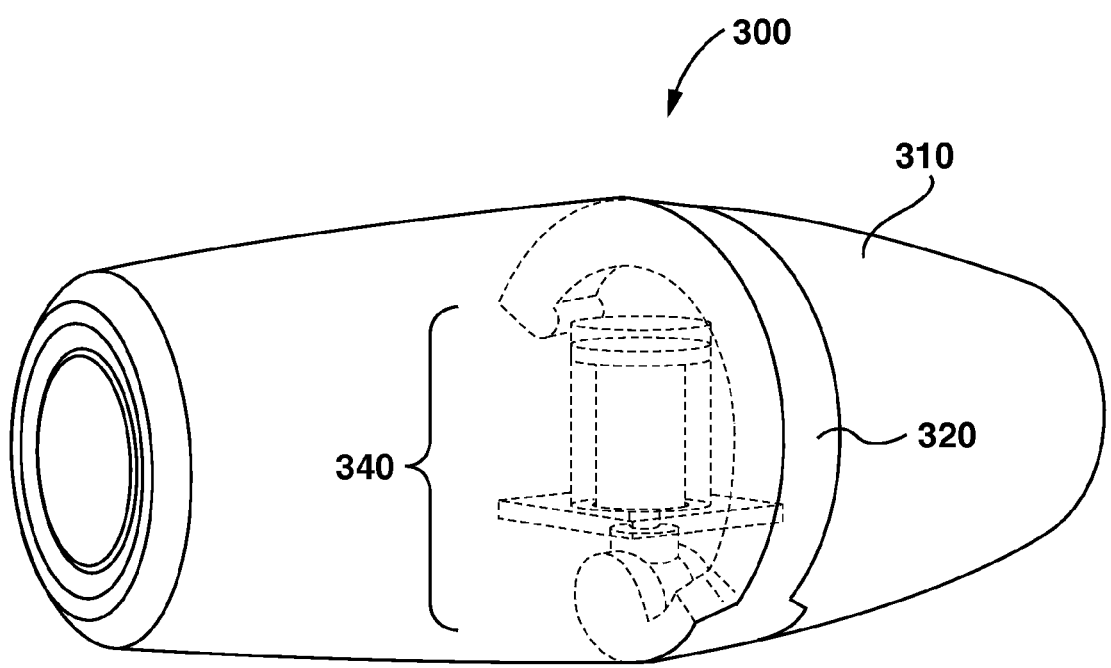
FIGS. 9A-D are a series of perspective views illustrating a handheld scale for weighing luggage in accordance with another embodiment showing the luggage engagement member moving from the first position to the second position, with the body of the scale shown as translucent to view the telescopic mechanism.

Scale 300 also includes a rotatable coupling 346 positioned at the lower end of lower telescopic member 325. Rotatable coupling 346 allows luggage engagement member 320 to be rotated from a 'folded' or 'stored' or 'closed' position (e.g. a position in which luggage engagement member 320 is generally contiguous with body 310) as shown in FIG. 9A, to an 'active' or 'opened' position (e.g. a position in which luggage engagement member 320 presents a surface 324 from which a piece of luggage can be supported) as shown in FIG. 9B.

Figure 9B:
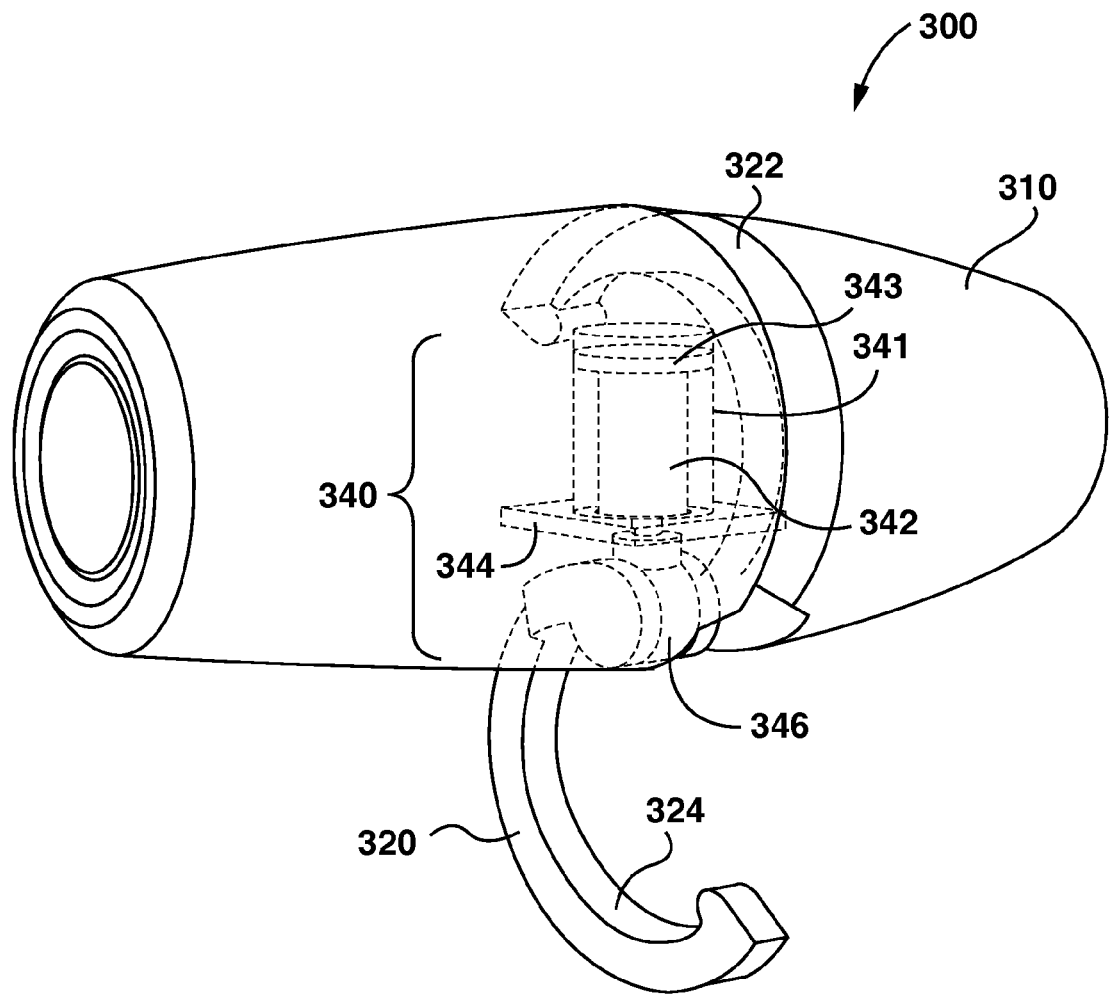
Figure 9C:
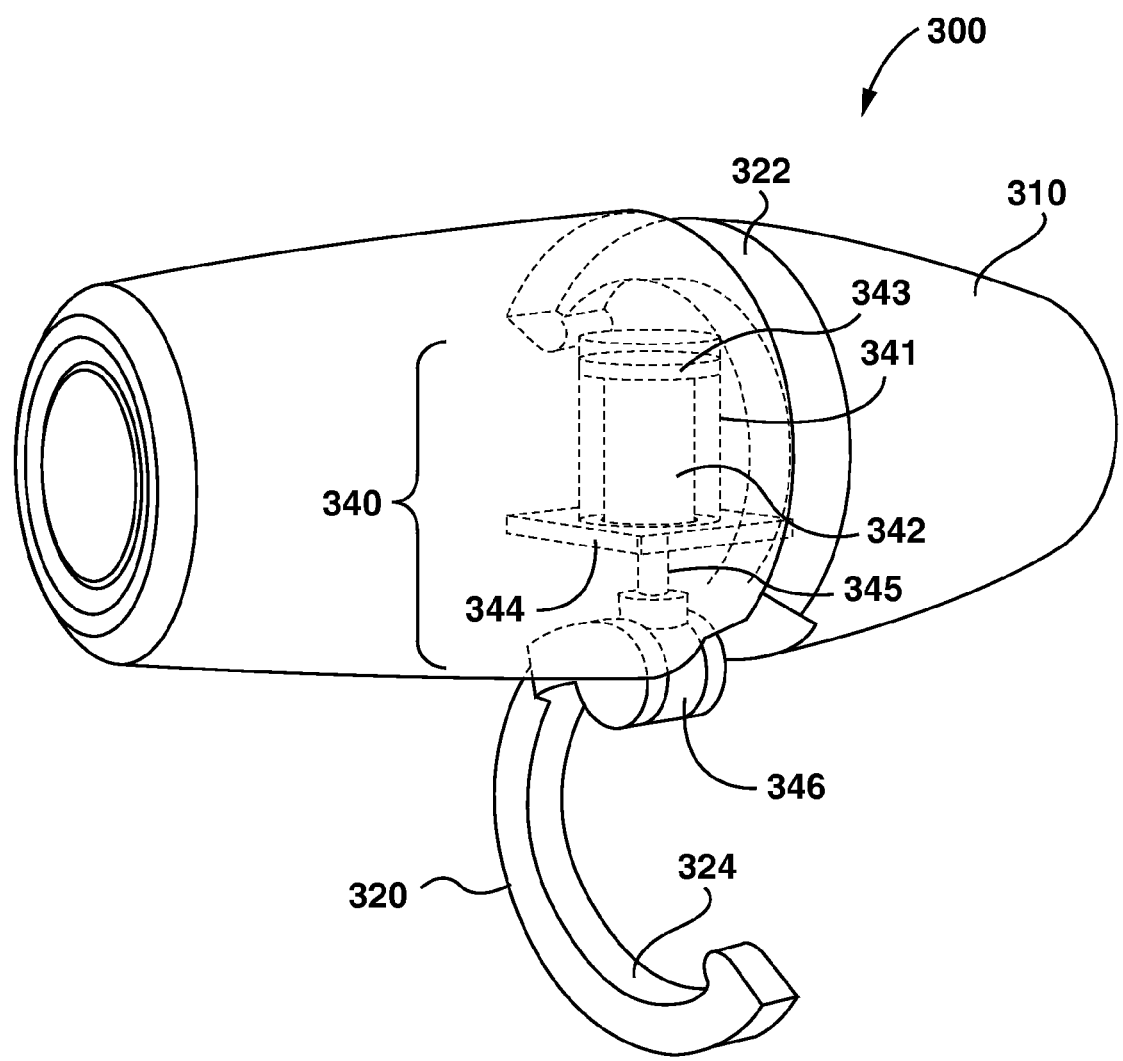
Figure 9D:
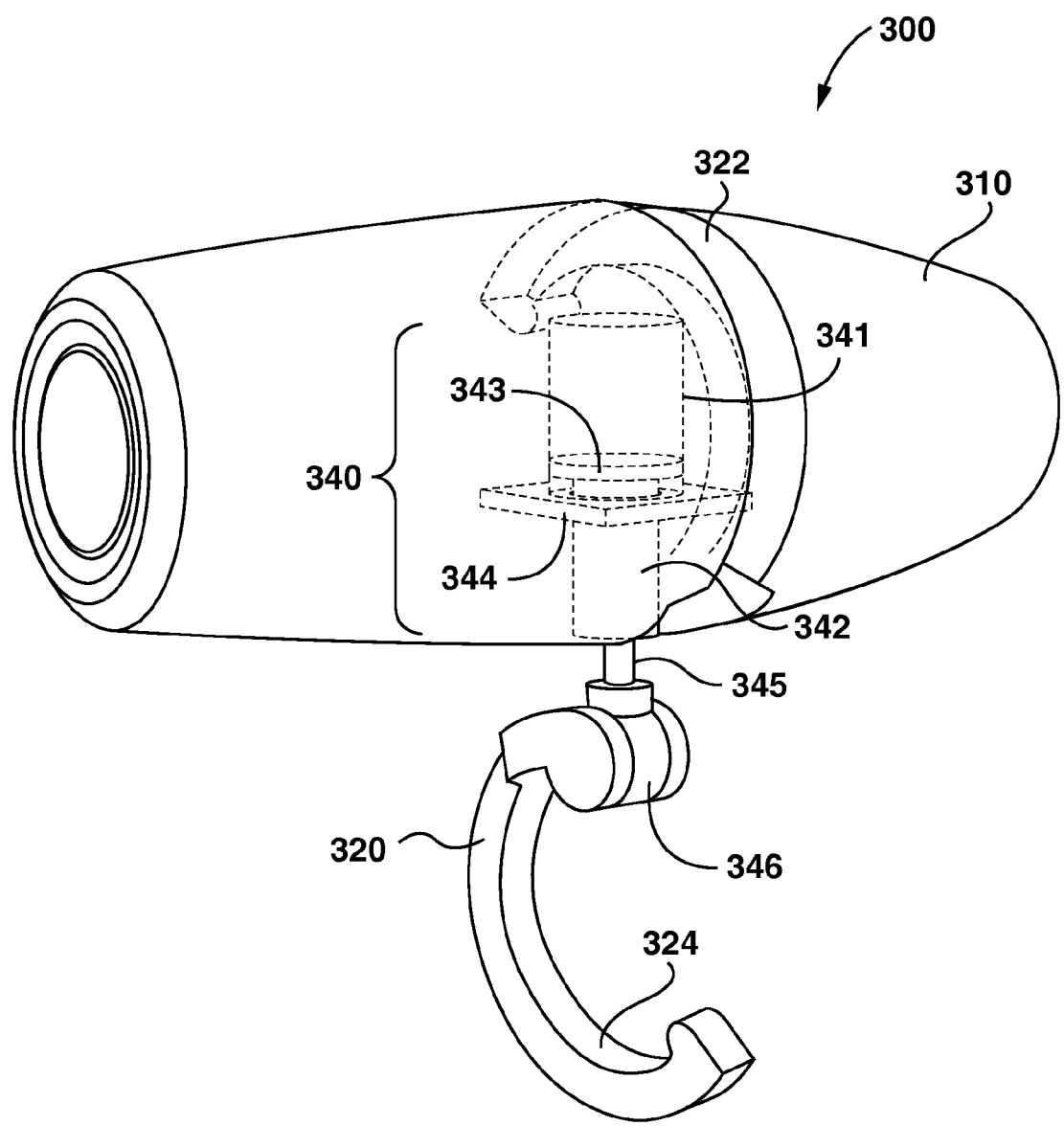

Scale 300 also comprises a telescopic mechanism, referred to generally as 340, that allows luggage engagement member 320 to be displaced relative to body 310 from an upper position (e.g. a position in which luggage engagement member 320 has been rotated but not displaced relative to body 310) as shown in FIG. 9B, to a lower position (e.g. a position in which luggage engagement member 320 has been displaced relative to body 310) as shown in FIG. 9D. This displacement of luggage engagement member 320 relative to body 310 provides a greater distance between surface 324 (from which a piece of luggage can be supported) and the lower face 314 of body 310. This increased distance (or clearance) between scale 300 and a handle of the luggage being weighed may allow a user to more easily and/or comfortably grasp body 310 while a piece of luggage is being supported by luggage engagement member 320.

In the illustrated embodiment, telescopic mechanism 340 includes an upper telescoping member 342 positioned within a cylindrical cavity 341 formed in body 310. A flange 343 is provided at the upper end of the upper telescoping member 342. Flange 343 is configured to engage a restraining plate 344 positioned at the lower end of cylindrical cavity 341, thereby restraining the linear travel of upper telescoping member 342.

In the illustrated embodiment, upper telescoping member 342 is a hollow member, and a lower telescoping member 345 is configured for telescoping movement within the hollow upper telescoping member. Thus, telescopic mechanism 340 provides multi-stage telescopic extension of the luggage engagement member 320 relative to body 310. It will be appreciated that other configurations of a telescopic mechanism may be used, e.g. to provide single-stage telescopic extension of the luggage engagement member 320.

In some embodiments, telescopic mechanism 340 may include a biasing member (not shown) configured to urge luggage engagement member 320 towards the upper position. Alternatively, such a biasing member may be configured to urge luggage engagement member 320 towards the lower position.

Components of telescopic mechanism 340 may be formed from any suitable material (e.g. aluminum, thermoplastic) selected so as to be durable and resistant to deformation and damage. Preferably, at least the upper and lower telescoping members 342, 345, restraining plate 344, and luggage engagement member 320 are made of metal (e.g. aluminum) in order to support what may be characterized as relatively heavy luggage (e.g. weighing over 100 lbs.).

Scale 300 also includes an electronic scale mechanism for calculating a weight of a load (e.g. a luggage bag) suspended from luggage engagement member 320. In some embodiments, the electronic scale mechanism is housed entirely within the body 310. Alternatively, some or all of the electronic scale mechanism may be positioned on (or within) luggage engagement member 320. For example, a load cell may be positioned within luggage engagement member 320, while a processor for receiving and processing signals from the load cell may be positioned within body 310. In some embodiments, the luggage engagement member 320 itself may function as a load cell (or as part of a load cell).

Alternatively, or additionally, some or all of the electronic scale mechanism may be positioned on (or within) telescopic mechanism 340. For example, one or more load cells may be positioned on or within upper telescoping member 342, lower telescoping member 345, and/or restraining plate 344. Alternatively, or additionally, some or all of the electronic scale mechanism may be positioned on (or within) rotatable coupling 346.

Figure 10A:
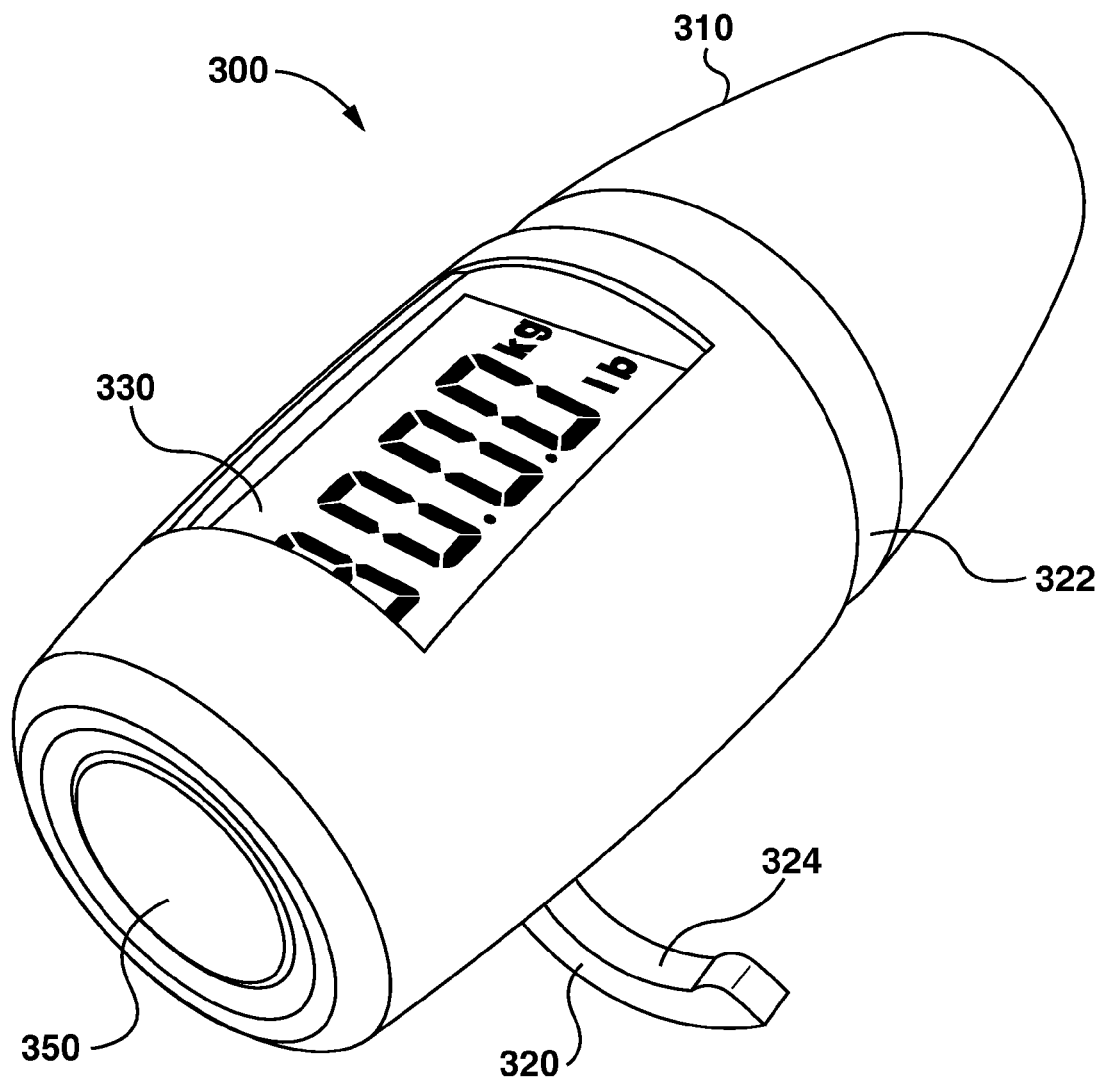
FIGS. 10A-C are perspective views of a handheld scales for weighing luggage in accordance with at least one embodiment.
Figure 10B:
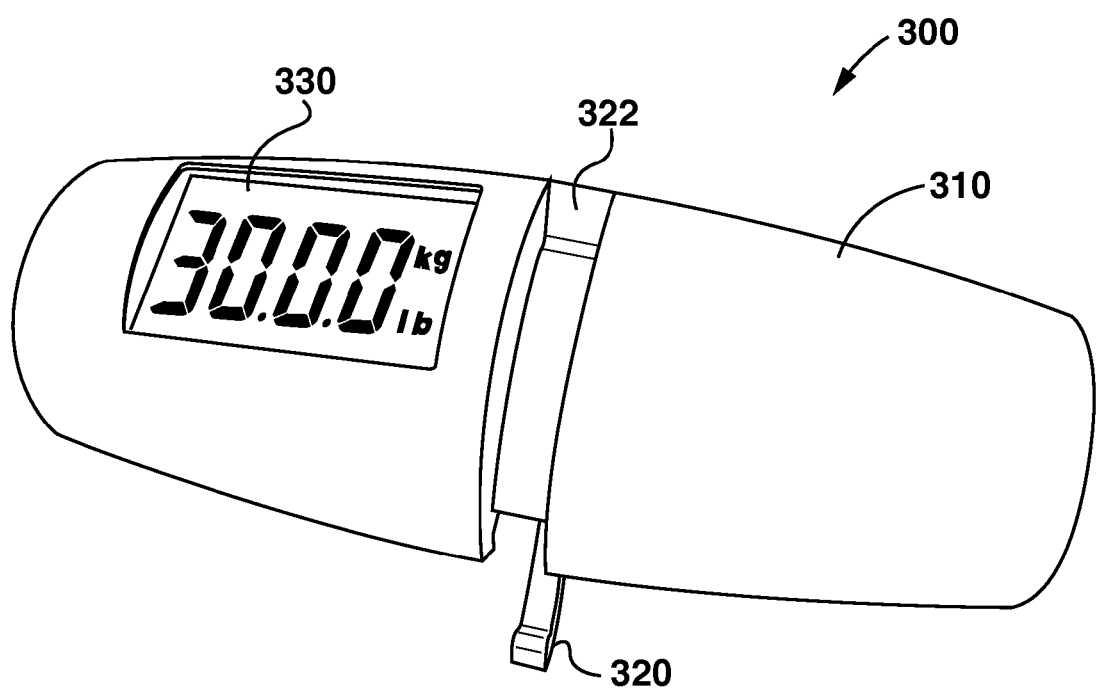
Figure 10C:
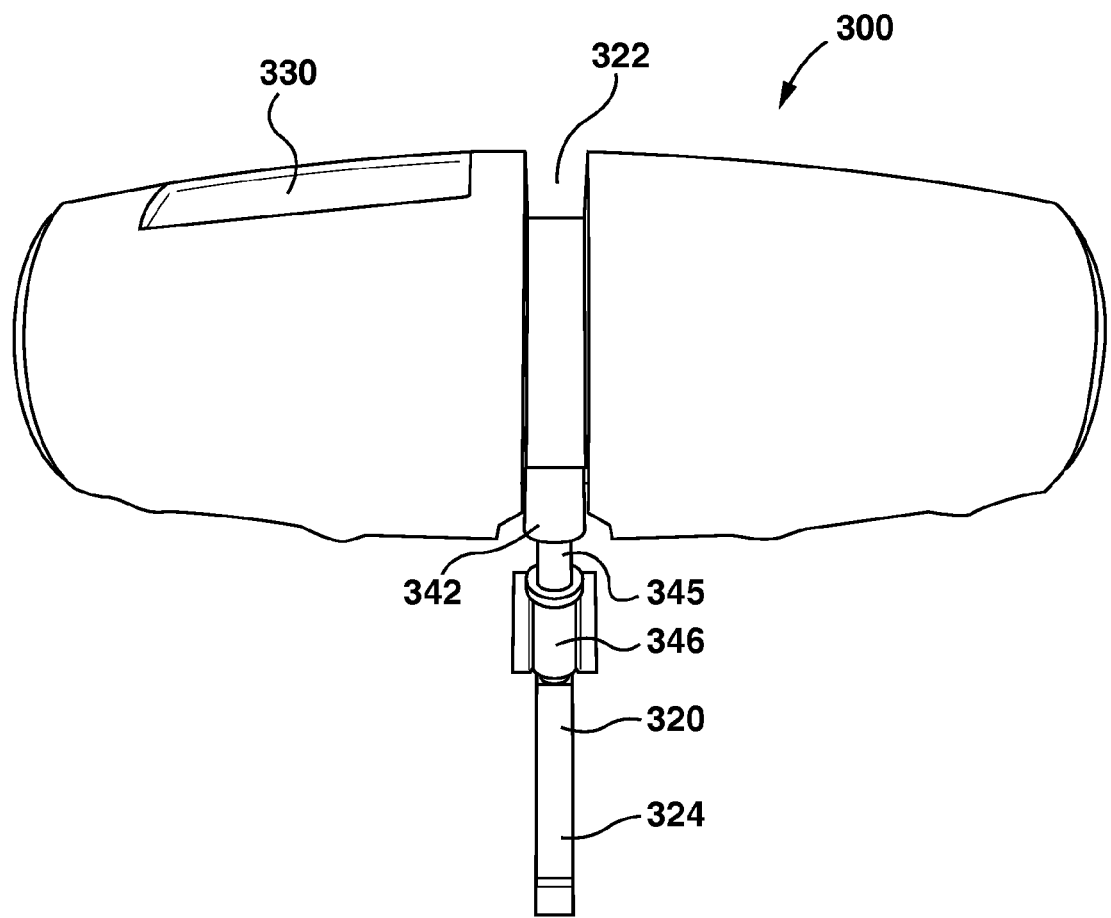

FIGS. 10A-C illustrate additional views of a scale 300.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A handheld scale for weighing luggage, the scale comprising:
    a body housing a power source, a processor, and a display, the processor being operatively coupled to the display;
    a luggage engagement member rotatably coupled to the body and moveable between a first position in which the luggage engagement member is generally flush with the body, and a second position in which the luggage engagement member presents a surface from which a piece of luggage can be supported;
    a load sensor operatively coupled to the luggage engagement member and the processor; and
    a switch activated by the luggage engagement member, the switch being configured such that:
    when the luggage engagement member is in the second position,
        the power source is operatively coupled to the display, the processor, and the load sensor, and the processor is configured to receive, from the load sensor, a signal proportional to a force applied to the surface relative to the body, and to provide, via the display, an indication of the force; and
    when the luggage engagement member is in the first position,
        the power source is operatively decoupled from at least the display.

2. The handheld scale of claim 1, wherein the body has a first and second opposed ends, a rotational coupling between the luggage engagement member and the body is located between the first and second opposed ends, and wherein, in the first position, the surface is located proximate one of the first and second ends.

3. The handheld scale of claim 1, wherein the luggage engagement member is generally hook shaped.

4. The handheld scale of claim 1, wherein the load sensor is positioned within the luggage engagement member.

5. The handheld scale of claim 1, wherein the load sensor is positioned within a rotational coupling between the luggage engagement member and the body.

6. The handheld scale of claim 1, wherein the indication comprises a numeric value in one of pounds and kilograms.

7. The handheld scale of claim 1, wherein the indication comprises an indication as to whether the force exceeds a specified value.

8. A handheld scale for weighing luggage, the scale comprising:
    a body housing a power source, a processor, and a display, the processor being operatively coupled to the display;
    a luggage engagement member rotatably coupled to the body and rotatable between a first position in which the luggage engagement member is generally flush with the body, and a second position in which the luggage engagement member presents a surface from which a piece of luggage can be supported;
    a load sensor operatively coupled to the luggage engagement member and the processor; and
    a switch configured to be actuated by a user;
        the processor being configured such that, in response to an actuation of the switch while the luggage engagement member is in the second position, the processor is configured to receive, from the load sensor, a signal proportional to a force applied to the surface relative to the body, and to provide, via the display, an indication of the force.

9. The handheld scale of claim 8, wherein the body has a first and second opposed ends, a rotational coupling between the luggage engagement member and the body is located between the first and second opposed ends, and wherein, in the first position, the luggage engagement member is located between the first and second ends.

10. The handheld scale of claim 9, wherein the switch is located at one of the first and second ends.

11. The handheld scale of claim 8, wherein the body is generally cylindrical, and wherein the luggage engagement member is generally arc shaped.

12. The handheld scale of claim 8, wherein the body has a longitudinal axis, and wherein the luggage engagement member rotates about an axis that is parallel to and offset from the longitudinal axis.

13. The handheld scale of claim 8, wherein the load sensor is positioned within the luggage engagement member.

14. The handheld scale of claim 8, wherein the load sensor is positioned within a rotational coupling between the luggage engagement member and the body.

15. The handheld scale of claim 8, wherein the display is located on an upper surface of the body, and wherein a lower surface of the body comprises at least one surface feature for assisting a user to grip the handheld scale.

16. The handheld scale of claim 8, wherein the indication comprises a numeric value in one of pounds and kilograms.

17. The handheld scale of claim 8, wherein the indication comprises an indication as to whether the force exceeds a specified value.

18. A handheld scale for weighing luggage, the scale comprising:
- a luggage engagement member operatively coupled to an electronic scale mechanism of the scale, rotatably coupled to a body of the scale, and moveable between a stowed position and a deployed position; and
- a switch activated by the luggage engagement member, the switch being configured such that:
  - when the luggage engagement member is moved to the deployed position, a display of the scale is activated, and
  - when the luggage engagement member is moved to the stowed position, the display is deactivated.

19. The handheld scale of claim 18, wherein, in the stowed position, the luggage engagement member is generally flush with the body, and in the deployed position, the luggage engagement member presents a surface from which a piece of luggage can be supported.

20. The handheld scale of claim 19, wherein the electronic scale mechanism comprises a load sensor and a processor, the processor being operatively coupled to the display and configured to receive, from the load sensor, a signal proportional to a force applied to the surface relative to the body, and when the display is active to provide, via the display, an indication of the force.

* * * * *